INVENTOR:
TOSHIO CHYO 3,134,448
METHOD AND APPARATUS FOR WEIGHING
Toshio Chyo, 262 Kashiracho, Kamichojamachi-Sagaru,
Nishinotoindori, Kamigyoku, Kyoto, Japan
Filed Nov. 13, 1959, Ser. No. 852,654
Claims priority, application Japan Nov. 14, 1958
1 Claim. (Cl. 177—15)

The present invention relates to method and apparatus for weighing by using a balance. More particularly the present invention relates to a weighing balance in which counter-weights are automatically deposited on the scale in accordance with the weight of a substance to be weighed and the weight of said substance is automatically indicated so as to be ready for reading.

The existing means for adding and subtracting weights in the weighing balance is so constructed that the weight of weights which are deposited on the weight pan increases stepwise one unit of mass at one unit turning angle of the handle for manipulating weights. And in the usual balance are commonly used a group of weights with masses of 1, 1, 2 and 5, or 1, 2, 2 and 5 units so that masses ranging from 1 to 9 units may be obtained by combining these weights. In the balance including such the existing means for adding and subtracting weights and the group of weights as above, there is the disadvantage that there are needed many times of addition and exclusion of a certain weight during the operation of depositing weights to obtain a certain amount of weight. For this reason the existing means for manipulating weights is so complicated in construction.

This invention has among its objects to present apparatus and method for weighing by using a balance in which the weighing operation is performed faster and the means for adding and removing weights is simpler.

Another object of this invention is to present a simple device for summing up and indicating the total weights added automatically and instantly.

Other objects of this invention will appear from the following specification and the novel features will be particularly pointed out in the claim at the end thereof.

In order that the invention may be clearly understood, it is described in detail with reference to the accompanying drawings, in which:

FIG. 3 shows one of levers for applying and removing weights;

FIG. 4 shows by way of example, with a perspective view, a device for indicating the total amount of weights deposited, said weights having masses of 1, 2, 4, 8 . . . $2^{n-1}$;

Figure 1:
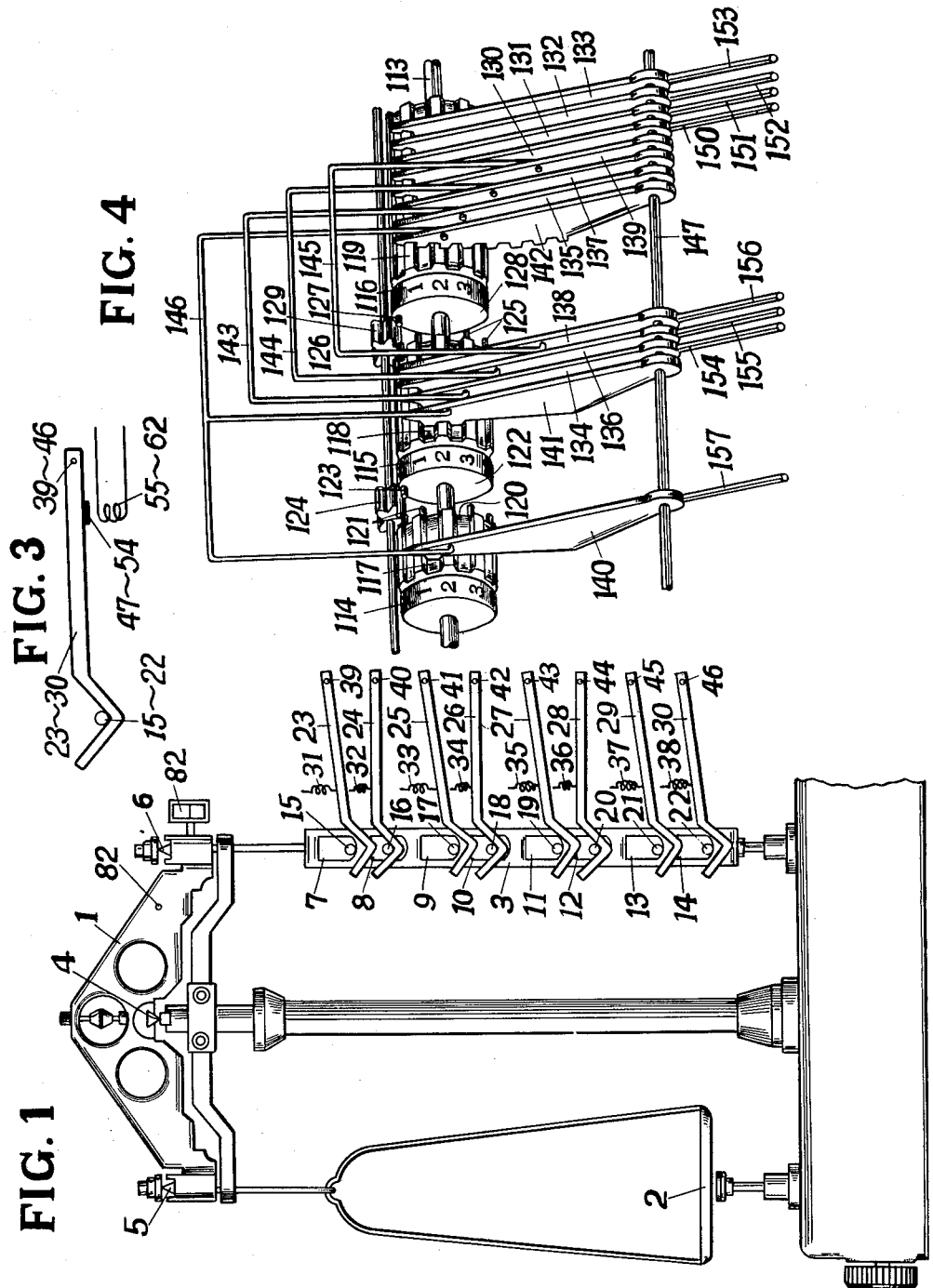
FIG. 1 is a front view, partly cut off, of a weighing balance which is used by way of example in the present invention.

Referring to FIG. 1, numerals 1, 2 and 3 represent a beam, commodity pan and a weight scale respectively. The beam 1 is fulcrumed at its center by means of a central knife edge 4. At both ends of the beam 1 are two knife edges 5, 6 from which the commodity pan and the weight scale hang suspended respectively. The weight scale is not a pan, but a kind of frame comprising two frames, facing each other (in FIG. 1 the rear frame is obstructed by the front frame), each of which is provided with several windows 7, 8, 9, 10 . . . 14 so as to deposit cylindrical weights 15, 16, 17 . . . 22 with different masses. 23, 24, 25 . . . 30 are levers for manipulating weights 15, 16, 17 . . . 22 respectively. These levers are usually held horizontal by spring 31, 32, 33 . . . 38 respectively, thereby lifting the weights 15, 16, 17 . . . 22, but if they are moved downward by an external force, the weights 15, 16, 17 . . . 22 come to be placed on the windows 7, 8, 9 . . . 14 respectively. FIG. 1 shows the case in which the first, third, fifth and seventh weights 15, 16, 17, 19 and 21 are placed on the weight frame 3. The levers 23, 24, 25 . . . 30 are fulcrumed at pivots 39, 40, 41 . . . 46 respectively.

As for the masses of weights, such a group of weights with masses of 1, 1, 2, 5 or 1, 2, 2, 5 or 1, 2, 3, 4, 5 that all cardinals (up to 9 or 10) can be obtained from their combination is of course available for use. In the following descriptions, however, the present invention will be illustrated for the case in which weights having masses of 1, 2, 4, 8 . . . $2^{n-1}$ are used. The above series of masses is advantageous in the feature that each and every mass of cardinal numbers can be combined with fewer weights than any other series of masses.

In FIG. 1 there are shown eight pieces of weights 15 to 22. It is supposed that these weights have the masses 1, 2, 4, 8, 16, 32, 64 and 128 g., respectively. Weights from 1 to 255 g. can be obtained by combining these eight different kinds of weights.

Figure 2:
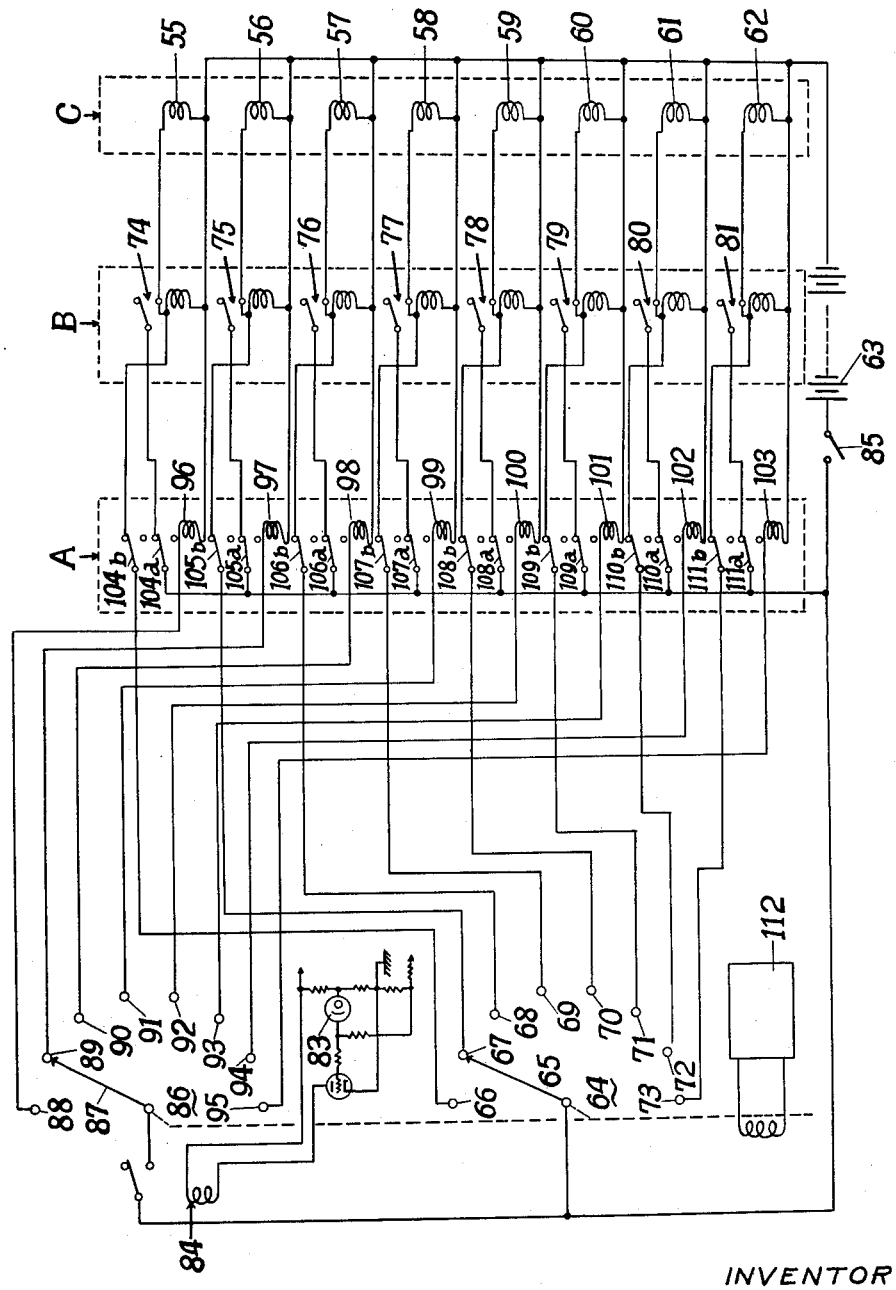
FIG. 2 is a diagram of a mechanism for electromagnetically applying and removing weights according to the present invention.

According to the present invention, weights are loaded one by one from the heaviest one and downward. FIG. 2 shows a mechanism for electro-magnetically adding and removing weights in accordance with this way. In FIG. 2 the same numerals as in FIG. 1 are applied to the weights, levers for loading and unloading them, their falcra, and springs for suspending the levers. The weights 15, 16, 17 . . . 22 are of 128, 64, 32 . . . 1 g. respectively.

As shown in FIG. 3 as to one of levers for manipulating weights, each lever has an armature (a piece of iron) so fixed on it as to face an electro-magnet. In FIG. 3, "47–54" indicates the armature fixed on the lever "23–29" and "55–62" represents the electro-magnet facing the armature "47–54." The electro-magnets 55 to 62 are also illustrated in FIG. 2. These are so arranged that only when the electro-magnets 55 to 62 are excited, they pull down the armatures 47 to 54 which they face and consequently the levers 23 to 29, thereby depositing the respective weights 15 to 22 on the weight scale (frame).

The electro-magnets 55 to 62 are connected to a single source of electricity 63, and when the movable arm (contactmaker) 65 of a rotary switch generally indicated as 64 comes into contact with any one of the contacts 66 to 73 arranged in semi-circle, a closed circuit is formed and thereby a current flows through the circuit.

The circuits for the electro-magnets 55 to 62 includes their respective magnet switches 74 to 81 which are usually kept open. Take the circuit for the electromagnet 55 for example, a magnet switch 74 is set in series between the contact point 66 and the electro-magnet 55. When this circuit is closed, the magnet switch 74 is closed so that the electro-magnet 55 comes to be connected directly to the electric source 63 through this newly closed circuit shunted from the magnet switch 74, as well as the principal circuit through the rotary switch 64. Therefore, once when the magnet switch 74 is closed, even if the principal circuit is opened at the rotary switch 64 by moving the arm 65 to another contact, electricity is kept being supplied through this shunt to the magnet 55, which continues to pull down the lever 23, thereby keeping the weight 15 as it is deposited. Thus, as the movable arm 65 of the rotary switch 64 is turned clockwise in FIG. 1 and brought into contact with one of the contact points 66 to 73 after another, weights 15 to 22 are loaded one after another in decending order from the heaviest one 15.

Now according to the present invention, the weights added are not only deposited on the scale, but also removed from it in some particular cases. If the sum of the weights added gets greater than the substance being weighed, the last weight added is taken off. The difference in weight between the sum of the weights added and the substance to be weighed is detected by the inclination of the beam 1. The following arrangement may be used by way of example for the present purpose. The beam 1 is provided with a pin hole 82 at its one side, the same side as the weight frame hangs. In front of the pin hole is set a light source and at the back of the same hole is a photocell (neither of them is shown in the figure). Suppose the beam at first is inclined leftwards because the object being weighed is heavier than the sum of the weights deposited. Addition of one or more weights makes the latter greater than the former, causing the beam inclined leftwards to lean to the right. The pin hole, the light source and the photocell are so arranged that the moment when the beam 1 passes a position of equilibrium in its oscillation, light comes into the photocell through the pin hole. Thus, the moment when the sum of the weights added exceeds the mass of the substance to be weighed can be detected by the photoelectric effect produced there and thereby the last weight added which has made the sum of the weights exceed the substance being weighed can be removed.

FIG. 2 also shows by way of example the circuit for removing the weights according to the above purpose. Referring to FIG. 2, 83 is a photocell in which the above mentioned photoelectric effect is produced and 84 is the relay which is electrified when the photoelectric effect is produced in the photocell and serves so as to close the circuit which is connected to the contact arm 87 of another rotary switch 86. The rotary switch 86 has eight contacts 88 to 95 which are engageable to the movable contact arm 87. Shunts which start from these eight contacts 88 include respectively electro-magnets 96 to 103 and are connected to a single electric source 63. The magnets 96 to 103 are so arranged that when they are electrified they break contact at two kinds of contacts 104a to 111a and 104b to 111b. Contacts 104a to 111a are respectively positioned in the circuit for connecting the above mentioned magnet switches 74 to 81 directly to the power supply 63. And 104b to 111b are respectively positioned in the circuits connecting the contacts 66 to 73 to the magnet switches 74 to 81. At the ordinary time, the contacts 104b to 111b are closed and the contacts 104a to 111a are so connected as to connect the magnet switches 74 to 81 directly to the electric source 63.

The mechanism will be explained in detail by way of example with reference to the circuit including the magnet 96 as shown in FIG. 2. With the contact arm 87 of the rotary switch 86 being in contact with the contact 88, when the photocell 83 produces the photoelectric effect as described above, a current flows through the circuit including the magnet 96, causing the magnet 96 to be excited. Thereby, the contact 104b which has ever been closed is opened and the contact 104a is switched from the lead for connecting the magnet switch 74 directly to the power supply 63 to the lead for connecting this magnet 96 directly to the power supply 63 without passing through the rotary switch 86. The circuit which has ever connected the magnet 55 directly to the power supply 63 through the magnet switch 74 is cut off at this contact 104a just opened. As a result, the magnet 55 loses its force, permitting the lever 23 to be pulled upward by the spring 31, so that the weight 15 which has been deposited on the weight frame 3 is lifted and taken off from the frame 3.

When the contact 104a is switched to the lead for connecting the magnet 96 directly to the power supply 63, there is formed a closed circuit which is never opened even if the photoelectric effect disappears in the photocell 83, or if the contact at the rotary switch 86 is broken, so that the above mentioned switching effect at the both contacts 104a and 104b may be maintained by the self-exciting of the magnet 96 by means of the newly closed circuit. The magnet 55, therefore, never recover its lost force, so that the weight 55 may be kept as it was taken off, because both the circuit through the rotary switch 64 and the circuit for connecting the magnet 96 directly to the power supply 63 are switched off at the contacts 104b and 104a respectively. The same is true of the other weights 16 to 22 which are associated with the contacts 89 to 95 of the rotary switch 86. These weights, once loaded, are taken off only when light comes into the photocell 83. According to the present invention the effect of exclusion of a certain weight after addition is never lost so far as the switch 85 of the power supply 63 is opened.

It is preferable for the rotary switch 86 to be so provided as to synchronize with the rotary switch 64 for loading the weights.

It is of course possible to turn the both arms 65 and 87 automatically as by using such a device as the so-called bank switch which operates intermittently every time when a pulse is generated. 122 shows a device for generating pulses at intervals of a certain hour, for example of one second.

When the switch 63 is opened, both the relay groups A (consisting of magnets 96 to 103 and two kinds of contacts 104a to 111a and 104b to 111b) and B (consisting of magnet switches 74 to 81) and the magnet group C (consisting magnets 55 to 62) lose excitation, thereby all the weights 55 to 62 being restored to the original condition in which they are lifted from the scale. The operation of unloading weights may, thus, be performed instantly and automatically.

As mentioned above, according to the present invention, the process of weighing comprises adding a smaller and smaller weight, while subtracting the last one added only when the sum of the weights added exceeds the mass of the substance being weighed, until final equilibrium can be achieved. As just described before, the weights are added in such an order that the greatest one is first tried and then comes the next lighter one, followed by lighter and lighter ones. Therefore, a weight, once rejected by means of the above mentioned operation, has been ultimately judged to be unnecessary for counter-balancing the substance being weighed, so that there is no need trying again to add that weight and final equilibrium can be very promptly achieved.

Especially when weights with masses of 1, 2, 4, 8 . . . $2^{n-1}$ are used, only 10 pieces of weights, that is to say ten different kinds of weights having masses of 1, 2, 4, 8, 16, 32, 46, 128, 256, 512 units will suffice to take care of substances having masses of all positive integers of three figures. With the ordinary set of weights having masses of 1, 1, 2, 5, or 1, 2, 2, 5 units, however, in order to weigh an object with a mass of three figures, four pieces of weights for each of one's, ten's and hundred's places, that is, twelve pieces are necessary. Compared with this, the present set of weights is very advantageous. Needless to say, the present invention does not confine itself to the above mentioned set of weights of masses 1, 2, 4, 8 . . . $2^{n-1}$, but it can also be applied to the usual set of weights having masses of 1, 1, 2, 5; 1, 2, 2, 5 etc. In this case, of course, it is easy to understand that the above mentioned method of adding weights is applicable. Also it may be added that with the balance of high sensitivity the minimum unit of the weight may be 0.1 or 0.01 g. as occasions demand.

The mass of the substance to be weighed is indicated by the sum of the weights loaded when equilibrium between the two is established. For the purpose of summing them up, a separate device may be used, or a weight indicating arrangement may be attached to the balance. In the latter case, in order to indicate the weight automatically a computer is necessary, which may be of an electrical or mechanical nature. FIGURE 4 shows by way of example a device for indicating the total amount of weights added in the case in which weights having masses of 1, 2, 4, 8 . . . $2^{n-1}$ are used. Referring to FIG. 4, three disks 114, 115, 116 are so mounted on a single piercing shaft 113 so as to turn freely about it. On the circumferential surface of each of the disks are engraved with the figures from "0" to "9." The disks have gears 117, 118, 119 respectively, which are comparatively thick. On the right side surface 120 of the first gear 117, and along its periphery, ten pins 121 are fixed equal distance apart. Facing this, on the left side surface 122 of the second disk and near its periphery is fixed a pin 123. A gear 124 of the same pitch as that of the pin gear comprising the ten pins 121 is provided between the first gear 117 and the second disk 115 so as to gear, on the one hand, with the pin gear 121 mounted on the right side surface 120 of the first gear 117 and, on the other, with the projecting pin 123 on the left side surface 122 of the second disk 115. One revolution of the second disk causes the combination of the first gear 117 attached to the disk 114 with a pin gear comprising the ten pins 121 to rotate $\frac{1}{10}$ of a complete revolution by means of the intermediate gear 124. The same relation exists between the gear 118 attached to the second disk 115 and the third disk 116. One revolution of the third disk 116 causes the combination of the second disk 115 with the gear 118 to rotate $\frac{1}{10}$ of a complete revolution. And 125 is a pin gear composed of 10 pins planted on the right side surface 126 of the second gear 118; 127 is a pin on the left side surface of the third disk 116; and 129 is an intermediate gear engaging with these two pin gears. The mechanism just described is a revolution counter of a well known type. And needless to say, other arrangements will replace it.

Now, an arrangement for indicating the sum of the weights added by means of the above mentioned computer is explained below. Suppose a set of eight weights consisting of the following denominations are used: 1, 2, 4, 8, 16, 32, 64 and 128 g. The weight of 1, 2, 4, 8 g. are associated with their respective segment gears 130, 131, 132, 133 by connecting the rods 150, 151, 152, 153 attached to said segment gears 130, 131, 132, 133 to the before-mentioned levers 30, 29, 28, 27, respectively. The segment gears 130, 131, 132 and 133 have one, two, four and eight teeth respectively and engage with the said third gear 119. The weights of 16, 32 and 64 g. are associated with their respective pairs of segment gears 134, 135; 136, 137; and 138, 139 which have one, six; three, two; six, four teeth respectively. 154, 155 and 156 are the rods which are attached to said segment gears 134, 136 and 138 and connected to the weight manipulating levers 26, 25 and 24, respectively. The segment gears 134 and 135 are jointed by a connecting rod 143, so that they may be turned at the same time. The other pairs of segment gears 136 and 137, 138 and 139 are also linked by connecting rods 144, 145 so that each of the pairs may be moved at the same time. The segment gears 134, 136 and 138 are engaged with the said second gear 118, while the rest 135, 137 and 139 with the said third gear 119. The 128 g. weight is so associated to three segment gears 140, 141 and 142 having one, two and eight teeth respectively, so provided as to be engaged with the first, second and third gears 117, 118 and 119 respectively. 146 is the connecting rod which connects three segment gears 140, 141 and 142 together so that the triplet may be moved at the same time. 157 is the rod which is attached to the segment gear 140 and connected to the weight manipulating lever 23. 147 is a pivot on which the said segment gears are mounted to turn freely about it.

To explain the operation of the above arrangement. As stated above, the triplet of segment gears 140, 141, 142, for the 128 g. weight 15 are linked with the lever 23 for the 128 g. weight so that they move together. If the lever 23 is turned in such a direction as to load the said weight 15, these three segment gears 140, 141, 142 are turned clockwise as shown in figure, causing the first gear 117, second gear 118 and third gear 119 to rotate $\frac{1}{10}$, $\frac{2}{10}$, and $\frac{8}{10}$ of one complete revolution respectively. If the lever 23 is turned in the opposite direction so as to unload the weight 15, the said process goes in the opposite way. In this way, corresponding to the 128 g. weight, the first disk 114 has been advanced one grade, the second disk 115 two grades and the third disk 116 eight grades in calibration. Thus we have the figures "128" indicated automatically. Here attention must be paid to the fact that such a phase difference among the three segment gears 117, 118, 119 is necessary as enables each of them to start turning a little later than the others. If the segment gears 140, 141, 142 were so provided as to engage with their corresponding gears 117, 118, 119 all exactly at the same time, it would conflict with the process through which one revolution of the second or third disks causes the first or the second ones to rotate $\frac{1}{10}$ of one revolution. Arrangements for the other weights will be evident from the above description, so no further explanation will be given. By direct readings of figures expressing the sum of the weights deposited, taken on the device described above, we can know the mass of the object which it is required to weigh.

Instead of the above mentioned set of weights with masses 1, 2, 4 . . . $2^{n-1}$ units, those of masses 1, 1, 2, 5 or 1, 2, 2, 5 or 1, 2, 3, 4, 5 are of course applicable to the above weight indicating mechanism. The present invention was described in the preceding pages as applied particularly to the usual weighing balance. It can also be applied to other scales using a beam and a set of weights, such as platform balances.

The means for depositing and removing weights cannot only be electrical as was described above in the present application, but also mechanical such as a manually operated handle.

Figure 5:
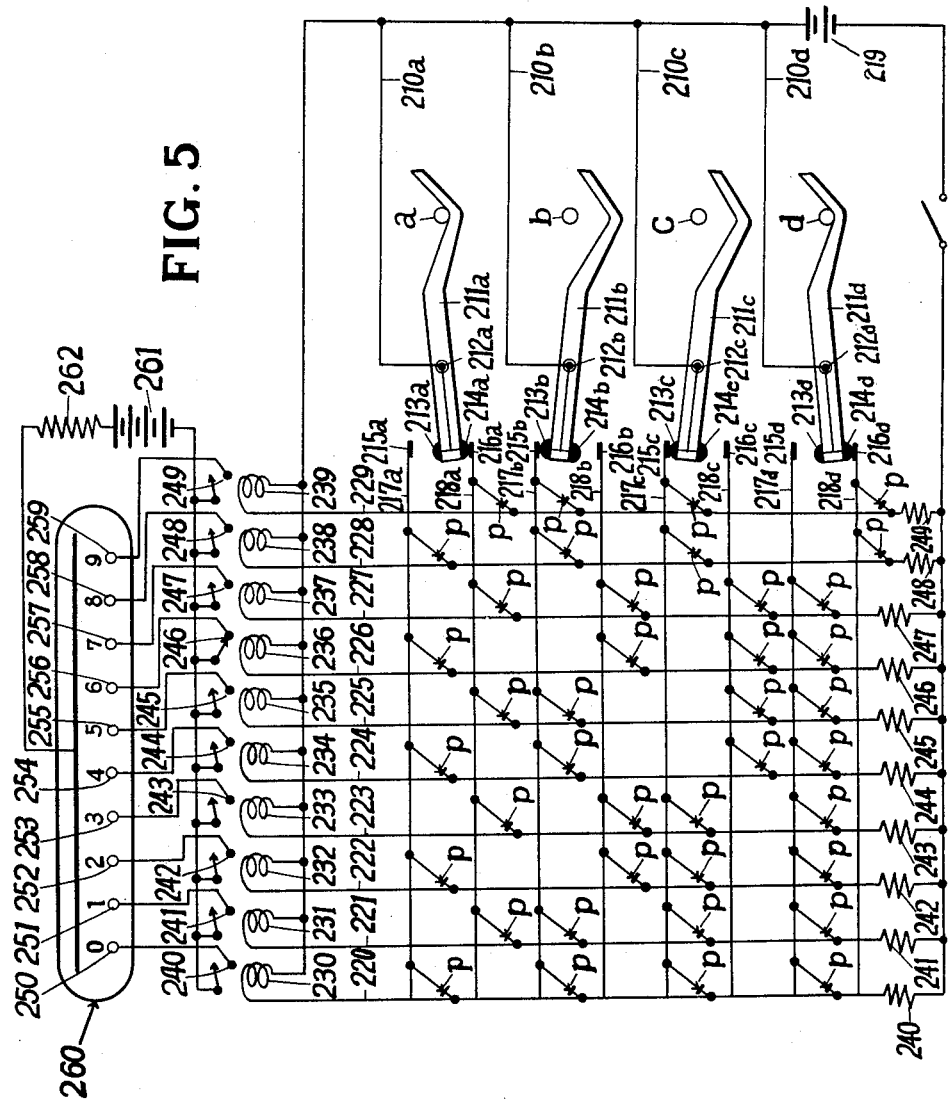
FIG. 5 is a diagram of a variation of the device for indicating the total amount of weights deposited in case in which the set of weights consists of four weights having masses of 1, 2, 4, 8 units respectively.

FIG. 5 shows a variation of the device for indicating the total amount of weights deposited.

In the usual balance, the arrangement for adding and removing weights is so constructed as to add them one by one, and indication of the sum of the weights added in figures or suitable symbols is possible with comparative ease by means of such a suitable mechanism as a revolution counter. In the weighing method according to the present invention, weights are not added unit by unit, as described before. In order to indicate in figures so as to be ready for reading, a special arrangement for summing them up is required. The present invention has also enabled this operation to be done automatically and instantly, by using means so comprising the ten addresses from "0" up to "9" as to make them receive an affirmative ("yes") or negative ("no") instruction in accordance with addition or subtraction of weights, so that the number of the address which receives affirmative instructions throughout all the weights can be indicated.

An apparatus for the balance with a set of four weights having masses of 1, 2, 4, 8 units will be described by way of example with reference to FIG. 5.

Referring to FIG. 5, $a$, $b$, $c$ and $d$ indicate the weights of 1, 2, 4 and 8 g. respectively. Levers 211$a$, 211$b$, 211$c$, 211$d$ for taking care of their respective weights $a$, $b$, $c$, $d$ are so fulcrumed at points 212$a$, 212$b$, 212$c$, 212$d$ as to move up or down about these fulcra, thereby loading or removing the respective weights on or from the weight scale or the like.

The operation of the levers 211$a$, 211$b$, 211$c$, 211$d$ may be the same as described before referring to FIGURES 1 to 5.

It may be added that the present invention is also applicable to the so-called "load constant balance," in which the weight that balances the substance being weighed is taken off. If this invention is to be applied to that balance, the words "add" or "addition" or similar words and "remove" or "removal" or similar words in the following descriptions should be read "remove" or "removal" or similar words and "add" or "addition" or similar words respectively. No further explanation of this will be given below.

One ends of the levers 211a, 211b, 211c, 211d, the other ends of which have their respective weights, have pairs of electrical contacts 213a, 214a; 213b, 214b; 213c, 214c; 213d, 214d respectively so attached to the upper and lower sides of each of them as to come in contact with their corresponding contact points 215a, 216a; 215b, 216b; 215c, 216c; 215d, 216d. The former contact points are connected by parallel leads 210a, 210b, 210c, 210d to a suitable source of electricity 219. From the contact points 215a, 216a; 215b, 216b; 215c, 216c; 215d, 216d come out their respective leads 217a, 218a; 217b, 218b; 217c, 218c; 217d, 218d arranged in columns. Of these leads, the leads 217a, 217b, 217c, 217d communicate an instruction when the weights a, b, c, d are deposited respectively, while the leads 218a, 218b, 218c, 218d do the same when the weights are removed. On the other hand, as members of the ten addresses from 0 up to 9, leads 220, 221 . . . 229 are arranged in rows, and at the same time connected in parallel with one another to the previously mentioned power supply 219. The leads 220 to 229 have magnet relays 230 to 239 and resistance members 240 to 249 for dropping voltage for stabilization, respectively.

According to the present invention, the above mentioned column leads 217a, 218a; . . . ; 217d, 218d for communicating instructions are connected through suitable rectifiers p selectively to the row leads as the addresses 220 to 229 in accordance with a certain rule.

To explain in detail, the lead 217a is conected to the leads 220, 222, 224, 226 and 228; the lead 218a to the leads 221, 223, 225, 227 and 229; the lead 217b to the leads 220, 221, 224, 225, 228 and 229; the lead 218b to the leads 222, 223, 226 and 227; the lead 217c to the leads 220, 221, 222, 223, 228 and 229; the lead 218c to the leads 224, 225, 226 and 227; the lead 217d to the leads 220, 221, 222, 223, 224, 225, 226 and 227; and the lead 218d to the leads 228 and 229, all through suitable rectifiers p. Through these connections, instructions are transmitted to the addresses to which they were meant to go.

To explain this operation by way of example. Referring to FIG 5, the 1 g. weight is shown removed and the lever 211a connects at the contact point 214a to the contact point 216a of the lead 218a for transmitting a negative instruction. As previously described, this lead 218a is connected to the leads 221, 223, 225, 227 and 229 which correspond to the addresses 1, 3, 5, 7 and 9. Therefore, when the contact points 214a and 216a are connected, the leads 221, 223, 225, 227 and 229 have been shortcircuited there, so that no circuit can flow through the magnet relays 231, 233, 235, 237 and 239, which are then not magnetized. This means that a negative instruction has been transmitted to the addresses 1, 3, 5, 7, 9 and an affirmative one to the other addresses 0, 2, 4, 8. As for the 2 g. weight, when a current flows through the lead 217b, the leads 220, 221, 224, 225, 228 and 229 which are connected to it have been shortcircuited, so that the magnet relays 230, 231, 234, 235, 238 and 239 are not magnetized. This means that a negative instruction has been sent to the addresses 0, 1, 4, 5, 8 and 9 and an affirmative one to the other addresses 2, 3, 6 and 7. As for the 4 g. weight, the leads 220, 221, 222, 228 and 229 are shorted so that a negative instruction is transferred to the addresses 0, 1, 2, 3, 8 and 9, while an affirmative one to the other addresses 4, 5, 6 and 7. And finally, as for the 8 g. weight, only the leads 228 and 229 are shorted, with the result that only the addresses 8 and 9 receive a negative instruction, while the others 0 to 7 an affirmative one.

Putting all these together, it is only the address 6 that has not received a negative instruction. This means that only the lead 226 is not shortcircuited so that the magnet relay 236 which is connected to this lead gets magnetized. The address 6 to which no negative instruction was communicated (or in other words, only affirmative instructions were transmitted) coincides with the total mass of the weights added (2 plus 4 equals 6). Now if a suitable arrangement is provided to be so operated by the magnet relay 236 as to indicate the figure "6," the sum of masses of the weights deposited has been expressed in a figure automatically and instantly. In like manners, the other magnet relays 230 to 239 except 236 are so provided with suitable means for indicating the numbers "0" to "9" except "6" as to indicate masses of the weights added ranging from 0 to 9 g.

In the above mentioned mechanism of selective contacts betwen the leads 217a, 218a; 217b, 218a; 217c, 218c; 217d, 218d arranged in columns for communicating instructions and the row leads 220 to 229, it must be that a current flows through only the magnet relay in the address whose number equals the sum of the masses of the added weights among the weights a, b, c and d. To give further details about this point, when a set of four weights of masses 1, 2, 4 and 8 g. are used as in the present example, all masses from 0 up to 15 g. can be obtained by combining them properly. The method of the combination is given in the following table, in which the signs "*" and "—" mean addition and subtraction of the weight respectively:

| Sum of Masses | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Weights: | | | | | | | | | | | | | | | | |
| 1 g | — | * | — | * | — | * | — | * | — | * | — | * | — | * | — | * |
| 2 g | — | — | * | * | — | — | * | * | — | — | * | * | — | — | * | * |
| 4 g | — | — | — | — | * | * | * | * | — | — | — | — | * | * | * | * |
| 8 g | — | — | — | — | — | — | — | — | * | * | * | * | * | * | * | * |

As shown in the above table, the mass of 0 g. is obtained by unloading all the four weights; that of 1 g. by adding only the 1 g. weight; . . .; 6 g. by adding the 2 and 4 g. weights; . . .; and 15 g. by loading all the four weights. In order to obtain a certain weight, there can be but one method of combination of the weights as shown in the table. In the above table, the total mass of the weights added (as expressed by the figures "0" to "15") coincides with the number of the addresses; and the signs "*" and "—" mean an affirmative and a negative instruction respectively to be given concerning each of the four weights 1, 2, 4, and 8 g. Minutely, as to the 1 g. weight a, a negative instruction should be given to the addresses 0, 2, 4, 6, 8, 10, 12, 14; as to the 2 g. weight b to the addresses 0, 1, 4, 5, 8, 9, 12, 13; as to the 4 g. weight c to the addresses 0, 1, 2, 3, 8, 9, 10, 11; and as to the 8 g. weight d to the addresses 0, 1, 2, 3, 4, 5, 6, 7. In the example shown in FIG. 5, the leads and circuits are so arranged that instructions may be communicated in accordance with the above rule. If a set of the weights 1, 2, 4 and 8 are to be used for each place (that is, for the one's, ten's, hundred's . . . places), it is unnecessary to produce the masses greater than 11 (masses in the next higher place) by combining the weights belonging to the one's place (the next lower place). Therefore, in the example shown in FIG. 5 only ten figures from "0" up to "9" are to be indicated. However, figures up to "15" can be indicated of course, if necessary.

As for the rectifying means p, rectifiers of any known types are available, among which a germanium diode for example, is also preferable for this invention.

The arrangement for operating the magnet relays 230 to 239 to indicate at the addresses the figures corresponding to the weights deposited may be of a mechanical or electrical nature. A figure indicating discharge tube 260, which is employed in this example as shown in FIG. 5, may be one of suitable means. In FIG. 5, 240 to 249 indicate switches which may be opened and closed by the magnet relays 230 to 239 respectively, and 250 to 259 are neon tubes with the shape of the figures "0" to "9," which are contained in a vacuum tube 260, and which are to be connected in parallel with one another to a power supply 261 through the switches 240 to 249 respectively. 262 is a resistance for stabilization.

Thus according to the present invention, when a magnet relay is magnetized, the switch which corresponds with it is closed so that a current may flow only through the circuit including the swittch just closed, thereby lighting the figure shaped neon tube which the circuit includes. The light neon tube indicates the sum of the deposited weights which balance the substance being weighed.

It will be easily understood from the above description that the present invention may also take other forms with any other set of weights, for example, those having masses of 1, 2, 2, 5; 1, 1, 2, 5 or 1, 2, 2, 4. A method of the combination of weights as for the set of weights having masses of 1, 2, 2, 5 is given in the following table, in which the signs "*" and "—" mean addition and subtraction of a weight respectively:

| Sum of Masses | 0 | 1 | 2 | 3 | 4 | 5 | 6 | 7 | 8 | 9 |
|---|---|---|---|---|---|---|---|---|---|---|
| Weights: | | | | | | | | | | |
| 1 g. (a) | — | * | — | * | — | — | * | — | * | — |
| 2 g. (b) | — | — | — | — | * | — | — | — | — | * |
| 2 g. (c) | — | — | * | * | * | — | — | * | * | * |
| 5. g. (d) | — | — | — | — | — | * | * | * | * | * |

Figure 6:
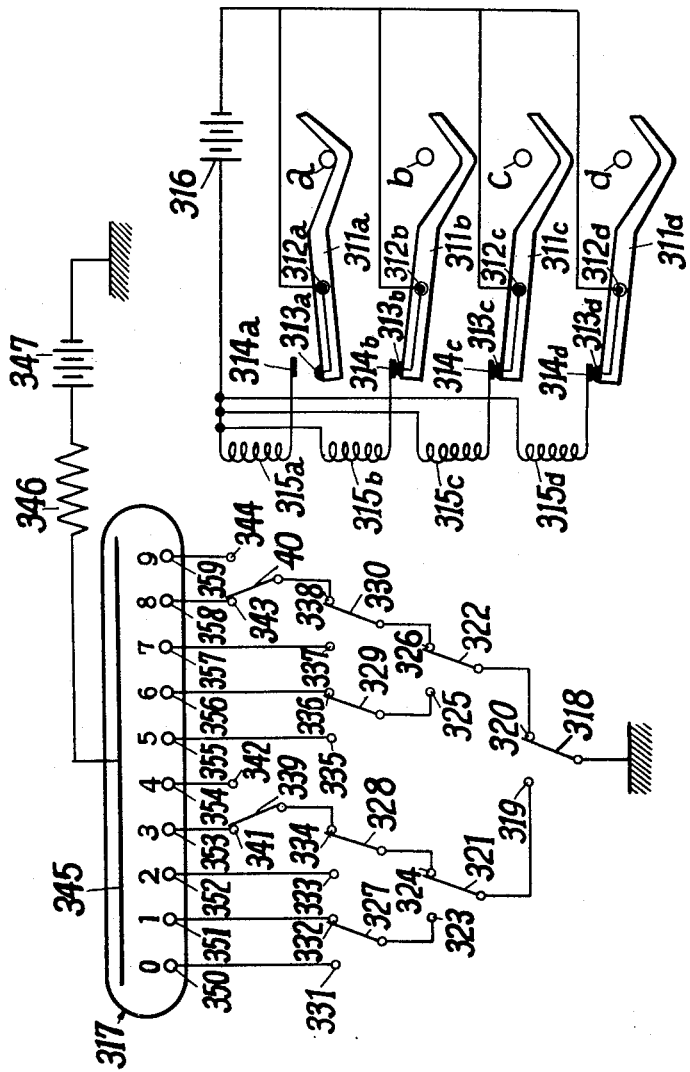
FIG. 6 is a diagram of another variation of the device for indicating the total amount of weights deposited in case in which the set of weights consists of four weights having masses of 1, 1, 2, 5 units respectively.

FIG. 6 shows another variation of the apparatus for indicating the total amount of weights deposited, which operates in accordance with addition and subtraction of weights, and comprises relays and ten circuits for indicating the figures "0" to "9" so that when a weight is deposited, the relays close those of the circuit for indicating the figures which include, as a component factor, the figure indicating the mass of the weight deposited, while when the weight is subtracted, the relays close those of the circuits for indicating the figures which do not include, as a component factor, the figure of the mass of the weight deposited.

An application of this invention to a set of weights of masses 1, 1, 2, 5 units will be minutely described below by way of example with reference to FIG. 6. The letters a, b, c and d represent weights of 1, 1, 2, 5 g. respectively. Levers 311b, 311c, 311d are so pivoted at the points 312a, 312b, 312c, 312d respectively as to turn about them, thereby depositing and removing the weights a, b, c and d on and from the weight scale or the like. The levers 311a, 311b, 311c, and 311d may be operated according to either the method as stated before or any other well known methods. FIG. 6 shows the state in which the weights b, c, and d are deposited and the weight a is removed.

On the one ends of the levers 311a, 311b, 311c, 311d opposite to those which have the weights, there are electrical contacts 313a, 313b, 313c, 313d respectively so provided as to come into contact with their corresponding contacts 314a, 314b, 314c, 314d when the weights are loaded. When this happens, the relays 315a, 315b, 315c, 315d get magnetized and operate to close and open the following circuits for indicating ten figures "0" to "9."

As to the method for indicating figures "0" to "9," any one of many arrangements of well known type may be used. In FIG. 6, a figure indicating discharge tube is used by way of example as one of the most suitable means. Referring to FIG. 6, 359 to 360 represent neon tubes with the shape of the figures "0" to "9," contained in a vacuum tube 317 and so arranged that only that neon tube in which electricity is discharged is lighted to show the figure.

Which of the ten neon tubes with the shapes of "0" to "9" is to be lighted is decided in the following way. Referring to FIG. 6, the contact maker 318, which is operated by the relay 315d, comes into contact with the right-hand contact point 320 when the relay 315d is magnetized, and the left-hand contact point 319 when the relay 315d is not magnetized. The next contact makers 321, 322 are connected to the contact points 319, 320 and operated by the relay 315c simultaneously. They come into contact with the right-hand contact points 324 and 326 respectively when the relay 315c is magnetized, and the left-hand contact points 323 and 325 respectively when the relay 315c is not magnetized. The contact makers 327, 328, 329 and 330 are connected to the contact points 323, 324, 325 and 326 respectively and operated by the relay 315b simultaneously. They come into contact with their respective right-handed contact points 332, 334, 336, 338 when the relay 315b is magnetized, and their respective left-hand contact points 331, 333, 335 and 337 when the relay 315b is not magnetized. The contact points 331, 332, 333, 335, 336, 337 are connected to the neon tube with the shape of the figures "0," "1," "2," "5," "6," "7" respectively, while the contact points 334, 338 are further connected to the contact maker 339, 340 respectively which are operated by the relay 315a. The contact makers 339, 340 come into contact with their respective right-hand contact points 342, 344 when the relay 315a is magnetized, and the left-hand contact points 341, 343 when the relay 315a is not magnetized. The contact points 341, 342, 343, 344 are connected respectively to the neon tubes 353, 354, 358, 359, in the shape of the figures "3," "4," "8," "9." The numerals 345, 346, and 347 represent the plate of the vacuum tube 317, a resistance and a power supply respectively.

Each of the contact makers can be switched from one of their corresponding pair of contact points over to the other. From the two contact points 319, 320 connected to the single contact maker 318 come out two leads, which go shunting at each of the other contact points until finally they reach the ten contact points corresponding to the figure-shaped neon tubes.

Among these ten circuits only one is completely closed, while the others are opened somewhere at the contact points. Thus the neon tube connected to this only circuit closed (in FIG. 6, the one 358 in the shape of "8") is lighted to indicate its figure.

To explain how the sum of the weights added is indicated in a figure, suppose for example the 5 g. weight d is deposited. The contact points 313d, 314d are connected, when the relay 315d operates to cause the contact maker 318 to come into contact with the right-hand contact points 320. This means that the circuit leading to the contact points 331, 332, 333, 341, 342 (which are connected to the neon tubes 350 to 354 with figures "0" to "4") have been broken here, leaving the other circuits so as to be able to be connected to the contact points 335, 336, 337, 343, 344 which correspond to the other neon tubes 355 to 359 with figures "5" to "9." The opposite is true when the weight d is removed.

As to the 2 g. weight, when it is deposited, while with the contact makers 321 and 322 being in contact with the contact points 324 and 326, the circuits to the neon tube 352, 353, 354 and 357, 358, 359 in the shape of "2," "3," "4," and "7," "8," "9" are left to be closed, the circuits to the other neon tubes are broken here at the contact points 323, 325. When the weight c is removed, the opposite is true. As for the 1 g. weight b, when it is deposited, the relay 315b operates the contact makers 327, 328, 329, 330 to leave the circuits leading to the neon tubes 351, 353, 354, 356, 358, 359 in the shape of figures "1," "3," "4," "6," "8," "9," so as to be able to be closed, while the other circuits are broken here at the contact points 331, 333, 335, 337. The opposite is true when the weight b is taken off. As for the last 1 g. weight a, when it is deposited, the contact makers 339, 340 close the circuits to the neon tube 354, 359 of the figures "4," "9," and open those to the other neon tubes 353, 358 with the figures "3," "8" when the weight is removed, the opposite is true.

The closing and opening of the contact makers at the contact points depending on addition and subtraction of the weights may be formulated into the following rule: when a weight (for example, the 2 g. weight,) is deposited, the circuits to the neon tubes of those figures which have the value of the mass of the weight (2 in the example) as their component factor (in the example, the number 2 is a component factor of 2, 3, 4, 7, 8, 9) are left able to be closed, while the others are broken here.

The apparatus is so arranged that the circuits are shunted from the two contact points 319, 320 of the first contact maker 318 operated by the relay 315d depending on addition and subtraction of the 5 g. weight d. It is of course possible to arrange the circuits in the opposite way—starting with the smallest weight. In this case, however, such a great many contact makers are needed that the arrangement becomes complicated. The arrangement shown in FIG. 6 is best, because its mechanism is simple and its operation smooth.

In the examples shown in FIG. 6, as the weights with masses 1, 1, 2, 5 are used, there are two methods of producing the masses of 2, 3, 5, 7, 8—in other words, these five numbers can be obtained by two methods of combining the component factors 1, 1, 2, 5. This results in that there are two ways of arranging the contact makers, either of which may be used. When the weight of masses 1, 1, 2, 5 are used, the arrangement of the circuits is not limited to that which is shown in the example of FIG. 6.

It is of course possible for the above method and apparatus to be applied not only to the set of the weights of masses 1, 1, 2, 5 but also to the other sets of weights, such as those of masses 1, 2, 2, 5, or 1, 2, 4, 8, and it will be easily understood that only one method of arrangement of the circuits is possible with the set of the weights of masses 1, 2, 4, 8.

I claim:

A weighing balance comprising a balance beam, a pan for holding an article to be weighed, means mounting said pan on one side of said beam, a group of weights of different masses, levers associated with said weights and operative to deposit and remove the respective weights from the other side of balance beam, electromagnets for activating said levers, a rotary switch operative to energize circuits for operating said electromagnets one after the other in a predetermined order, first magnet relays connecting said electromagnets directly to a power supply bypassing said rotary switch, second magnet relays operative to activate both the circuit for connecting the respective electromagnets through said rotary switch to the power supply and the circuit for connecting the respective electromagnets directly to the power supply simultaneously, a second rotary switch constructed and arranged to make and break the circuits for electrifying said second magnet relays one after the other in the same order as in said first rotary switch, said two rotary switches being synchronized, a third magnet relay for completing the circuit including said second rotary switch, means for electrifying said last named magnet relay when the sum of weights loaded exceeds the weight of the article being weighed, and means for computing the total weight of weights loaded.

References Cited in the file of this patent

UNITED STATES PATENTS

| 1,101,390 | Benton | June 23, 1914 |
| 1,661,556 | Bryce | Mar. 6, 1928 |
| 1,718,007 | Rival | June 18, 1929 |
| 2,468,334 | Kennedy | Apr. 26, 1949 |
| 2,514,174 | Adshead | July 4, 1950 |
| 2,688,477 | Lindars | Sept. 7, 1954 |

FOREIGN PATENTS

| 2,117 | Great Britain | 1892 |